Patented Feb. 16, 1937

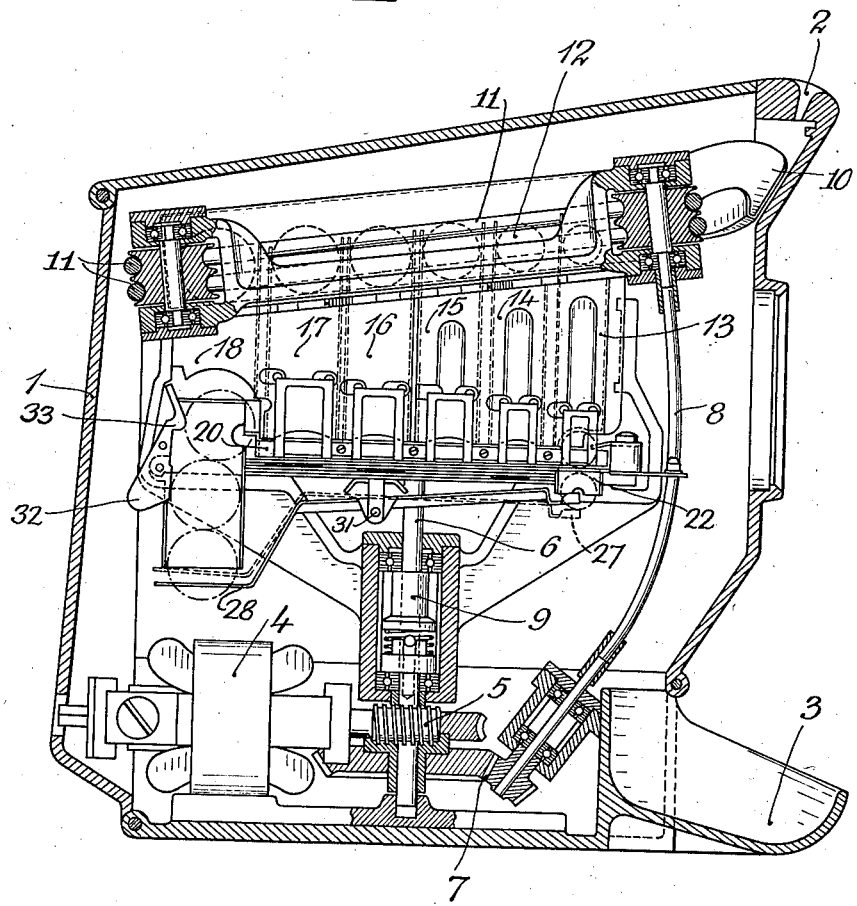

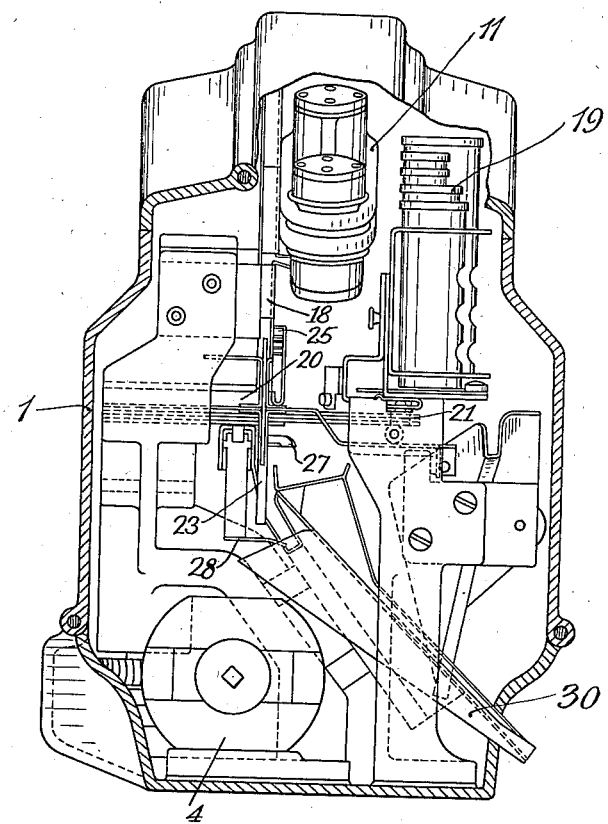

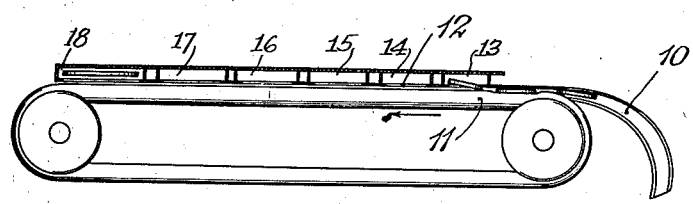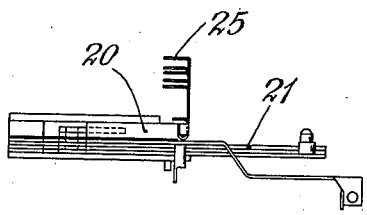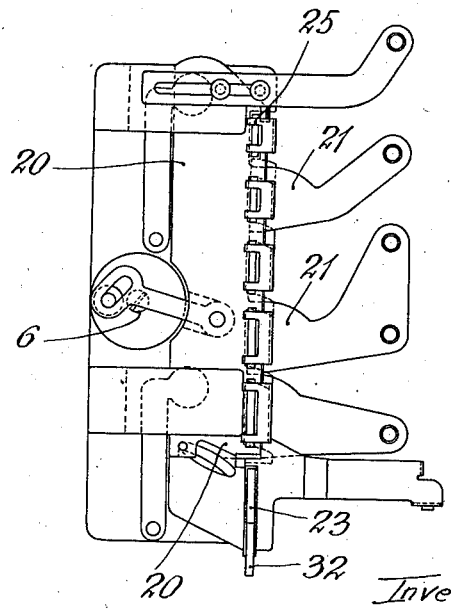

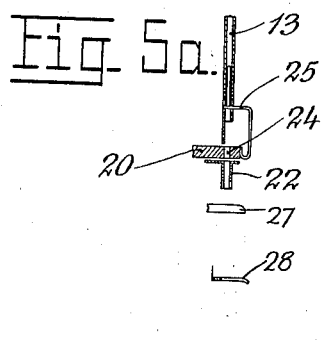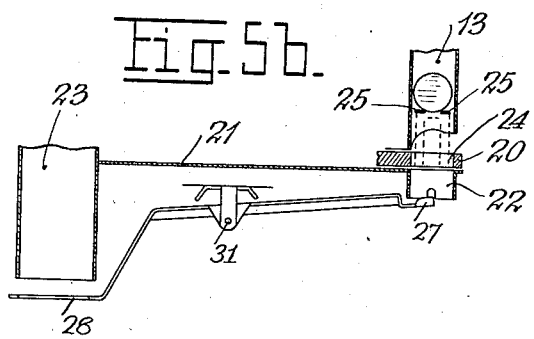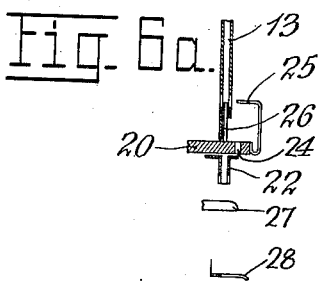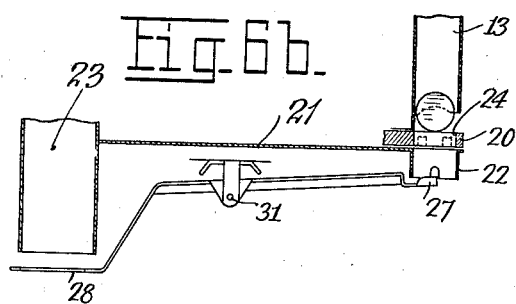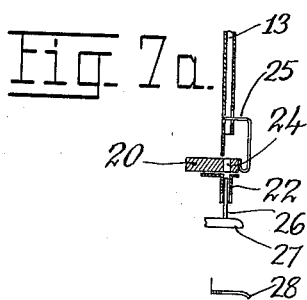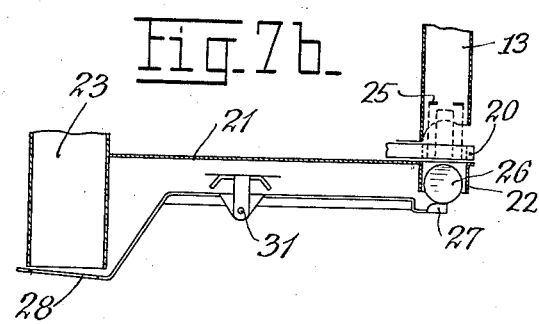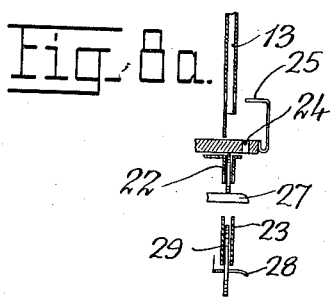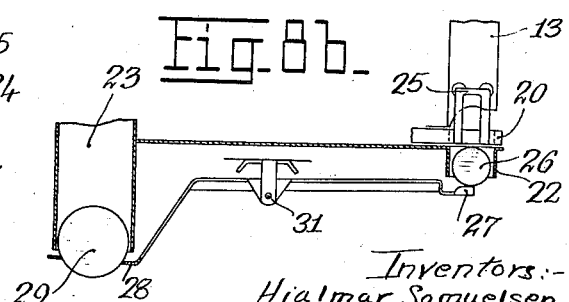

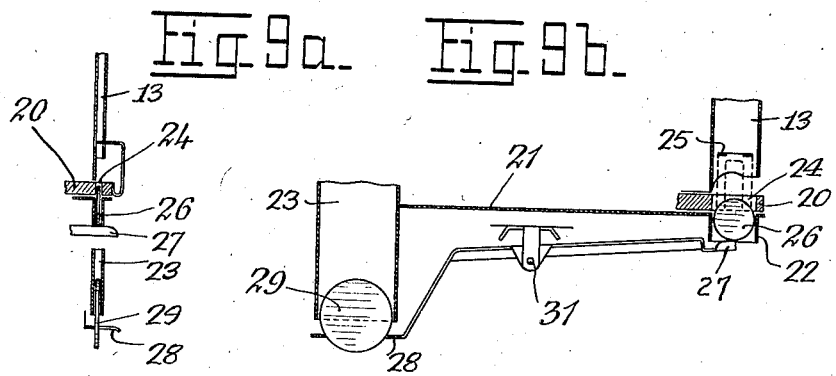
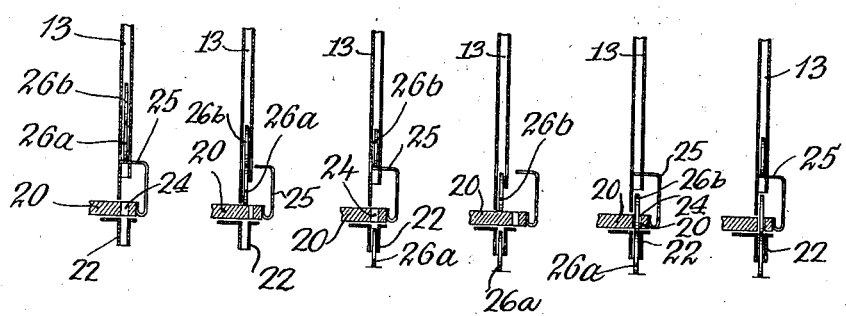
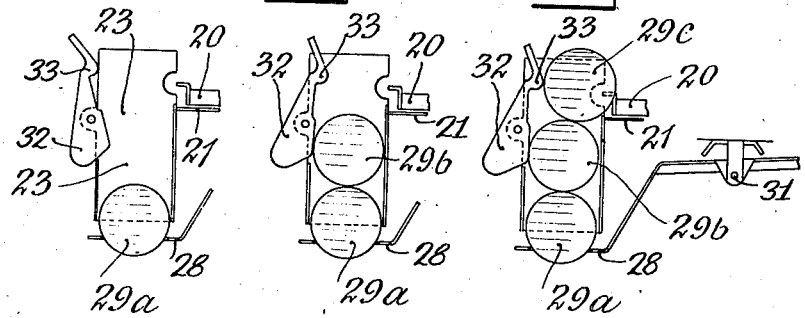

2,070,846

UNITED STATES PATENT OFFICE 2,070,846

PAYING AND MONEY CHANGING DEVICE

Hjalmar Samuelsen, Oslo, and Jacob de Rytter Kielland, Vinderen, near Oslo, Norway Application April 27, 1935, Serial No. 18,586
In Norway February 12, 1935

2 Claims. (Cl. 194—85)

The present invention relates to the type of paying and money changing devices, which amongst other uses are employed on tramcars, autobuses and the like, and which are adapted to return to the payer the difference between the monetary value of the coin paid into the device and the stipulated amount of payment.

After a coin has passed through its coin channel it serves as a coupling element between a mechanically driven reciprocating member (driving slide) and another movable member (coin releasing slide), which after being coupled with the driving slide serves to release one or more coins from a number of change coin stacks, with the effect of transferring change coins to an amount equal to the difference between the coin introduced and the stipulated amount of payment to a tray located on the outside of the device in order to make these change coins accessible to the payer.

In the paying and coin changing devices of this type payment and/or coin changing can only take place by means of coins the value of which is equal to or higher than the stipulated amount to be paid.

One object of the present invention is to provide a paying and changing device of this type in which it is also possible to effect payment by means of two or more coins, the value of which is lower than the stipulated amount of payment when the total amount of such coins is equal to or exceeds said stipulated amount.

This is attained in accordance with the invention by preventing coins, the value of which is less than the stipulated amount of payment from actuating the coin releasing mechanism until further coins have been put into the device, so that the total amount of the coins introduced is equal to or exceeding the stipulated amount of payment.

In accordance with the invention coins of equal denomination lower than the stipulated amount of payment, as well as coins of different denominations all being lower than the stipulated amount of payment may be utilized, and in both cases means are provided preventing these coins having a lower value than the stipulated amount of payment from operating until the stipulated amount of payment or an amount exceeding that has been introduced into the device.

In order to attain this object the coin releasing slides adapted to be actuated by coins having a value less than the stipulated amount, are located below the corresponding driving slide, and are provided with pockets which are so deep, that the first coin or coins introduced drop through the opening provided in the driving slide and into the pocket of the coin releasing slide, without effecting coupling of the slides, such coupling only taking place when the coin pocket of the coin releasing slide has taken up a number of coins, the total value of which is equal to or exceeds the stipulated amount.

In order to effect cooperation between two or more coins of different value, the total value of which is equal to or exceeds the stipulated amount, the bottoms of the coin pockets in such coin releasing slides are interconnected by means of a lever arrangement or the like in such a manner that the introduction of a coin in one of these pockets has the effect of releasing the bottom of the other pocket, with the effect that one coin less is needed in said other pocket in order to effect coupling with the driving slide and consequent actuation of the changing and registering device.

One form of the invention is illustrated on the drawings, on which Fig. 1 is a longitudinal section, and Fig. 2 an end view of the apparatus illustrated seen from the left side of Fig. 1 with the wall of the exterior housing cut through.

Fig. 3 illustrates the coin introduction channel and the coin sorting device seen from above with the top of the casing removed.

Fig. 4 illustrates driving slide and coin releasing slide with cooperating parts seen from above with the overlaying parts of the device removed.

Fig. 4a is a side view of the parts illustrated on Fig. 4.

Figs. 5a, 6a, 7a, 8a, 9a and 5b, 6b, 7b, 8b and 9b are views showing the cooperation between the coin pockets for two coins of different size, both having a value less than the stipulated amount.

Figs. 10, 11, 12, 13, 14 and 15 illustrate a number of stages in the operation connected with a coin channel and pocket, in which there have been introduced a number of coins of equal size, each having a value less than the stipulated amount of payment.

Figs. 16, 17 and 18 illustrate another form of coin pocket and coupling device for several coins of equal size, each having a value lower than the stipulated amount of payment.

In the following a description will first be given of the main features of the apparatus, reference being made to Figures 1, 2, 3 and 4, it being noticed that most of these main features are common to a number of well known apparatuses for the same or similar purposes.

Further below a description will be given of the features which form the new part of the present invention, reference being made to Figures 5 to 18.

In the form illustrated the paying and money changing device is enclosed in a casing 1, which is provided at the top with a coin introduction opening 2 and at the bottom with a tray 3 adapted to receive the change coins.

The mechanism is driven by means of an electric motor 4 driving a vertical shaft 6, by means of a worm drive 5, said vertical shaft 6 serving to reciprocate the driving slide, and also through bevel gears 7 a flexible shaft 8, serving to drive the conveyor device of the coin assorter. The vertical driving shaft 6 is provided with a slip clutch 9 adapted to slip in case some part of the mechanism should be stopped during the operation, whereby breakage of the operating members is prevented.

A coin introduced through opening 2 will pass through channel 10, Fig. 3, and will continue through a channel, one side of all of which is formed by the rubber covering bands 11, whereas the other side wall is provided with openings such as 12—see Figs. 1 and 3—of different size adapted to take up the different coins introduced.

The rubber covering bands 11 are inclined with relation to the bottom of the channel, so as to press the coins towards the latter, and at the same time pressing the coins against the opposite side wall having the coin openings.

Said openings 12 communicate with the upper ends of chutes or channels 13, 14, 15, 16, 17, 18, which serve in the usual manner to conduct the coins to pockets in which they serve to couple a driving slide reciprocated by means of rotating shaft 6 with coin releasing slides, which serve in the usual manner to release coins from the changing coin stacks 19, in order to return to the payer an amount equal to the difference between the value of the coin introduced and the stipulated amount of payment.

As the system comprising a continually reciprocating driving slide and a number of coin releasing slides adapted to be coupled with the driving slide by means of coins introduced into the apparatus and serving to release change coins from individual change coin stacks is well known per se (see for instance British Patent No. 390,413), this part of the device will need no further description.

In the known paying and money changing apparatus of this kind payment may only be effected by means of coins having a higher value than the stipulated amount of payment.

In accordance with the present invention payment can also take place by means of several individual coins of equal or different value less than the amount stipulated, and the arrangements by means of which these objects are attained will now be described with reference to Figs. 5–18.

Figs. 5–9 illustrate the operation of the arrangement when two coins of different value are introduced, having a total value equal to the amount to be paid. On Figs. 5 to 9, 20 indicates a part of the reciprocating driving slide, whereas 21 is a part of the corresponding coin releasing slide, which is provided with two pockets 22, 23, for the two coins the sum of which is equal to the stipulated amount of payment. 13 is the coin chute or channel for the smallest coin, and when this coin passes through the chute it will either engage the top surface of driving slide 20 or—if the driving slide is in the position illustrated on Fig. 5a, in which the coin opening 24 in the driving slide is located directly below the coin stacks 13—it will be stopped by fingers 25, which are attached to the driving slide (see also Fig. 4), and project into the coin chute 13, so that they prevent a coin from dropping directly into opening 24.

When the driving slide 20, as illustrated on Figs. 6a and 6b has been moved some way towards the right, coin 26 will drop down so as to rest on the top surface of driving slide 20, and when the latter again returns to the position illustrated on Fig. 5a, the coin as indicated on Figs. 7a and 7b will drop through opening 24 and into pocket 22 of coin releasing slide 21.

The bottom of this pocket is formed by one end 27 of a two-armed lever which is pivoted about the stationary pivot 31, and the other arm 28 of which forms the bottom of pocket 23 for the second and bigger of the two coins in question.

When this coin 29 then drops into its pocket 23 as illustrated on Figs. 8a and 8b, it will act on arm 27 so as to raise coin 26 so as to come in engagement with the bottom surface of driving slide 20, and when the driving slide is then again returned to the position illustrated on Fig. 5a, coin 26 as illustrated on Figs. 9a and 9b is further raised so as to be partly introduced into opening 24 of the driving slide, thereby coupling the coin releasing slide 21 with the driving slide 20.

By means of this coupling the coin releasing slide is forced to follow the driving slide on its next stroke, carrying the two coins with it so as to transfer the same to a collecting box in the usual manner (through coin chute 30, Fig. 2).

In case two coins of the same size as coin 26 are introduced, these will both drop through chute 13 as indicated on Fig. 10, on which the two coins are designated with 26a and 26b.

They are first stopped in the usual manner by the fingers 25, then as illustrated on Fig. 11 the lower coin 26a will drop on to the top surface of driving slide 20. When driving slide 20 returns to its original position as indicated on Fig. 12, fingers 25 prevent the top coin 26b from dropping, whereas the lower coin 26a falls through opening 24 in the driving slide, so as to arrive in the position illustrated on Fig. 7b.

During the next reciprocating movement of the driving slide, coin 26b is first dropped on to the top surface of the driving slide, as illustrated on Fig. 13, and then through opening 24 as illustrated on Fig. 14, so as to rest on top of coin 26a, which is already placed in pocket 22.

Coin 26b will then effect coupling between driving slide and coin releasing slide, which will therefore in the usual manner transfer coins 26a and 26b to a collecting box, and in case the sum of these coins is higher than the stipulated amount of payment, the coin releasing slide will also in a known manner release from the corresponding change coin stack a coin, the value of which is equal to the difference, said coin being transferred in the usual manner to the change coin tray.

Another mode of operation which may be used in connection with payment by means of several coins having an individual value lower than the stipulated amount of payment is illustrated on Figs. 16, 17 and 18.

On these figures 20 illustrates part of the driving slide and 21 part of the coin releasing slide with coin pocket 23.

The first coin 29a will come to rest at the bottom of coin pocket 23 as indicated on Fig. 16 (corresponding to Fig. 9b).

The next coin 29b will rest on top of the first coin and in that position will engage a two-armed lever 32, in such a manner that a projection 33 on the upper arm of said lever will project sideways into the upper part of the coin pocket 23. The third coin 29c is pressed sideways by means of knob 33, and is thereby brought into the path of the driving slide 20, so as to couple the same with the coin releasing slide 21, transferring the coins from pocket 23 to the collecting box and possibly transferring change coin or coins from the coin stacks to the change coin tray in the usual manner.

We claim:

1. In a money changing device which records payments and returns change for payment in excess of a stipulated amount of payment, a driving slide having openings therein, means whereby said driving slide can be reciprocated, a coin-releasing slide, underlying said driving slide, and having pockets therein, said coin-releasing slide being adapted to be coupled to said driving slide by a coin, the said coin-releasing slide, if necessary, releasing coins the sum of which will represent the proper change, coin stacks overlying the openings in said driving slide, a lever extending between said pockets and pivoted therebetween, the ends of said lever being adapted to underlie said pockets, so that after one coin has been introduced into one pocket and rests on one end of said lever, introduction of another coin through the other pocket will depress the other end of the lever, and will raise the first coin to serve as a couple between said slides, the said coins which are individually of lower value than the stipulated amount of payment, passing, when fed into the device, from the coin stacks through the openings in the driving slide to the pockets in the coin-releasing slide, said pockets being so deep that the first of the said coins which individually has a value less than the said stipulated amount of payment will not engage the driving slide until additional coins have been fed in, and therefore will not cause coupling between the two slides.

2. In a money changing device which records payments and returns change for payments in excess of a stipulated amount of payment, a driving slide having openings therein, means whereby said driving slide can be reciprocated, a coin-releasing slide underlying said driving slide and having pockets therein, one of which pockets is longer than the other, said coin-releasing slide being adapted to be coupled to said driving slide by a coin, the said coin-releasing slide serving for releasing coins the sum of which will represent the proper change, coin stacks overlying the openings in said driving slide, a two-armed lever extending between said pockets and pivoted therebetween, one end of said lever being adapted to underlie one pocket and the other end being offset to underlie the longer pocket and having a slot therein of diameter smaller than that of the coins adapted to pass through the longer pocket, so that after one coin has been introduced into one pocket and rests on one end of the lever, introduction of another coin through the other pocket will cause the second coin to be received in the slot in that end of the lever, and will depress that end of the lever, thus raising the first coin to serve as a coupling between said slides, the said coins, which are individually of lower value than the stipulated amount of payment, passing, when fed into the device, from the coin stacks through the openings in the driving slide to the pockets in the coin-releasing slide, said pockets being so deep that the first of the said coins which individually has a value less than the said stipulated amount of payment will not engage the driving slide until additional coins have been fed in, and therefore will not cause coupling between the two slides.

HJALMAR SAMUELSEN.
JACOB DE RYTTER KIELLAND.